(12) United States Patent
Liu et al.

(10) Patent No.: US 8,356,086 B2
(45) Date of Patent: Jan. 15, 2013

(54) DISTRIBUTED NON-NEGATIVE MATRIX FACTORIZATION

(75) Inventors: Chao Liu, Bellevue, WA (US);
Hung-chih Yang, Bellevue, WA (US);
Jinliang Fan, Snoqualmie, WA (US);
Li-wei He, Redmond, WA (US); Yi-Min Wang, Bellevue, WA (US)

(73) Assignee: Microsoft Corporation, Redmond, WA (US)

( * ) Notice: Subject to any disclaimer, the term of this patent is extended or adjusted under 35 U.S.C. 154(b) by 273 days.

(21) Appl. No.: 12/750,772

(22) Filed: Mar. 31, 2010

(65) Prior Publication Data

US 2011/0246573 A1   Oct. 6, 2011

(51) Int. Cl.
*G06F 15/16* (2006.01)
*G06F 15/173* (2006.01)
*G06F 17/30* (2006.01)

(52) U.S. Cl. ........ 709/220; 709/212; 709/217; 709/223; 709/226; 709/238; 707/709

(58) Field of Classification Search .................. 709/204, 709/212, 217–219, 226, 238; 707/709
See application file for complete search history.

(56) References Cited

U.S. PATENT DOCUMENTS

| | | | |
|---|---|---|---|
| 7,424,150 | B2 | 9/2008 | Cooper et al. |
| 2009/0055139 | A1 | 2/2009 | Agarwal et al. |
| 2009/0132901 | A1 | 5/2009 | Zhu et al. |

OTHER PUBLICATIONS

Sudarsan Tandri et al., Automatic Partitioning of Data and Computations on Scalable Shared Memory Multiprocessors, 1997, IEEE, pp. 64-73.*

Olivier Beaumont et al., Matrix Multiplication on Heterogeneous Platforms, Oct. 2001, IEEE, col. 12, No. 10, pp. 1033-1051.*
Tao Li et al., The Relationships among various Nonnegative Matrix Factorization methods for Clustering, 2006, IEEE.*
Daniel D. Lee et al., Algorithms for Non-negative Matrix Factoriztion.*
Manish Gupta et al., Demonstration of Automatic Data Partitioning Tehniques for Parallelizing compliers on Multicomputers, Mar. 1992, IEEE, vol. 3, No. 2, pp. 179-193.*
Karen D. Devine et al., Parallel Hupergraph Partitioning for Scientific Computing, 2006, IEEE.*
Jennifer M. Anderson et al., Global Optimizations for Parallelism and Locality on Scalable Parallel Machines, 1993, ACM-SIGPLAN.*
Patrik O. Hoyer, Non-negative Matrix Factorization with Sparseness Constraints, 2004, Journal of Machine Learning Research, pp. 1457-1469.*
Cai, et al., "Probabilistic Dyadic Data Analysis with Local and Global Consistency", Retrieved at << http://www.cs.mcgill.ca/~icml2009/papers/34.pdf >>, ACM International Conference Proceeding Series, Proceedings of the 26th Annual International Conference on Machine Learning, vol. 382, Jun. 14-18, 2009.

(Continued)

*Primary Examiner* — David Lazaro
*Assistant Examiner* — Farzana Huq (57) ABSTRACT

Architecture that scales up the non-negative matrix factorization (NMF) technique to a distributed NMF (denoted DNMF) to handle large matrices, for example, on a web scale that can include millions and billions of data points. To analyze web-scale data, DNMF is applied through parallelism on distributed computer clusters, for example, with thousands of machines. In order to maximize the parallelism and data locality, matrices are partitioned in the short dimension. The probabilistic DNMF can employ not only Gaussian and Poisson NMF techniques, but also exponential NMF for modeling web dyadic data (e.g., dwell time of a user on browsed web pages).

20 Claims, 9 Drawing Sheets

OTHER PUBLICATIONS

Chen, et al., "Non-negative Matrix Factorization for Semi-supervised Heterogeneous Data Co-clustering", Retrieved at << http://ieeexplore.ieee.org/stamp/stamp.jsp?arnumber=05184838 >>, IEEE Transactions on Knowledge and Data Engineering, IEEE computer Society Digital Library, IEEE Computer Society, Ju. 17, 2009.

Neruda, et al., "Implementing Boolean Matrix Factorization", Retrieved at << http://www.springerlink.com/content/44m13204672w5555/fulltext.pdf >>, Lecture Notes in Computer Science, Proceedings of the 18th international conference on Artificial Neural Networks, Part I, vol. 5163, Sep. 3-6, 2008.

Sia, et al., "Efficient Computation of Personal Aggregate Queries on Blogs", Retrieved at << http://delivery.acm.org/10.1145/1410000/1401967/p632-sia.pdf?key1=1401967&key2=9794793621&coll=GUIDE&dl=GUIDE&CFID=72194984&CFTOKEN=42284995 >>, International Conference on Knowledge Discovery and Data Mining, Proceeding of the 14th ACM SIGKDD international conference on Knowledge discovery and data mining, Aug. 24-27, 2008.

Bast, et al., "Insights from Viewing Ranked Retrieval as Rank Aggregation", Retrieved at << http://www.mpi-inf.mpg.de/~iweber/framework/insights.pdf >>, WIRI, Proceedings of the International Workshop on Challenges in Web Information Retrieval and Integration, Apr. 8-9, 2005.

Agarwal, et al., "Predictive Discrete Latent Factor Models for Large Scale Dyadic Data", Retrieved at << http://cseweb.ucsd.edu/~mar008/docs/PDLF_Presentation.pdf >>, International Conference on Knowledge Discovery and Data Mining, Proceedings of the 13th ACM SIGKDD international conference on Knowledge discovery and data mining, Aug. 12-15, 2007.

Agichtein, et al., "Improving Web Search Ranking by Incorporating User Behavior Information", Retrieved at << http://www.mathcs.emory.edu/~eugene/papers/sigir2006ranking.pdf >>, Annual ACM Conference on Research and Development in Information Retrieval, Proceedings of the 29th annual international ACM SIGIR conference on Research and development in information retrieval, Aug. 6-11, 2006.

Baeza-Yates, et al., "Query Recommendation Using Query Logs in Search Engines", Retrieved at << http://66.102.9.132/search?q=cache%3Alok4UoGgnGUJ%3Aciteseerx.ist.psu.edu%2Fviewdoc%2Fdownload%3Fdoi%3D10.1.1.85.8688%26rep%3Drep1%26type%3Dpdf+Query+recommendation+using+query+logs+in+search+engines&hl=en >>, In Current Trends in Database Technology—EDBT 2004 Workshops, vol. 3268/2004, Nov. 18, 2004.

Berry, et al., "Algorithms and Applications for Approximate Nonnegative Matrix Factorization", Retrieved at << http://66.102.9.132/search?q=cache:x8uoepLkYj0J:citeseerx.ist.psu.edu/viewdoc/download%3Fdoi%3D10.1.1.140.1963%26rep%3Drep1%26type%3Dpdf+Algorithms+and+applications+for+approximate+nonnegative+matrix+factorization&cd=1&hl=en&ct=clnk >>, Computational Statistics & Data Analysis, vol. 52, No. 1, Sep. 15, 2007.

Burges, et al., "Learning to Rank with Nonsmooth Cost Functions", Retrieved at << http://research.microsoft.com/en-us/um/people/cburges/papers/LambdsRank.pdf >>, In Neural Information Processing Systems (NIPS), 2006.

Chang, Edward., "Parallel Algorithms for Mining Large-scale Datasets", Retrieved at << http://mmds.imm.dtu.dk/presentations/chang.pdf >>, 2009.

Chang, et al., "PSVM: Parallelizing Support Vector Machines on Distributed Computers", Retrieved at << http://66.102.9.132/search?q=cache%3AUkzYakBPYLsJ%3Aciteseerx.ist.psu.edu%2Fviewdoc%2Fdownload%3Fdoi %3D10.1.1.143.7569%26rep%3Drep1%26type%3Dpdf+A+Parallelizing+support+vector+machines+on+distributed+computers&hl=en >>, In Advances in Neural Information Processing Systems, vol. 20, 2007.

Chen, Danny Z., "Efficient Geometric Algorithms on the Erew Pram", Retrieved at << http://www.computer.org/portal/web/csdl/doi/10.1109/71.363412 >>, IEEE Transactions on Parallel and Distributed Systems, vol. 6, No. 1, Jan. 1995.

Chen, et al., "Collaborative Filtering for Orkut Communities: Discovery of User Latent Behavior", Retrieved at << http://www2009.org/proceedings/pdf/p681.pdf >>, International World Wide Web Conference, Proceedings of the 18th international conference on World wide web, Apr. 20-24, 2009.

Chen, et al., "Large-scale Behavioral Targeting", Retrieved at << http://www.cc.gatech.edu/~zha/CSE8801/ad/p209-chen.pdf >>, International Conference on Knowledge Discovery and Data Mining, Proceedings of the 15th ACM SIGKDD international conference on Knowledge discovery and data mining, Jun. 28-Jul. 1, 2009.

Chu, et al., "Map-Reduce for Machine Learning on Multicore", Retrieved at << http://citeseerx.ist.psu.edu/viewdoc/download?doi=10.1.1.71.4156&rep=rep1&type=pdf >>, Neural Information Processing Systems (NIPS), Dec. 5, 2006.

Wen, et al., "Query Clustering Using User Logs", Retrieved at << http://research.microsoft.com/en-us/um/people/jrwen/jrwen_files/publications/QC-TOIS.pdf >>, ACM Transactions on Information Systems, vol. 20, No. 1, Jan. 2002.

Kenny, et al., "Dyadic Data Analysis", Retrieved at << http://www.routledgeeducation.com/books/Dyadic-Data-Analysis-isbn9781572309869 >>, Guilford Press, Sep. 4, 2006.

Dean, et al., "MapReduce: Simplified data processing on large clusters", Retrieved at << http://labs.google.com/papers/mapreduce-osdi04.pdf >>, Communications of the ACM, vol. 51, No. 1, Jan. 2008.

Deerwester, et al., "Indexing by Latent Semantic Analysis", Retrieved at << http://lsi.research.telcordia.com/lsi/papers/JASIS90.pdf >>, Journal of the American Society for Information Science, vol. 41, 1990.

Dong, et al., "Application of Latent Semantic Analysis to Protein Remote Homology Detection", Retrieved at << http://bioinformatics.oxfordjournals.org/cgi/content/abstract/bti801v1 >>, Bioinformatics, vol. 22, No. 3, Feb. 2006.

Filippone, et al., "PSBLAS: A Library for Parallel Linear Algebra Computation on Sparse Matrices", Retrieved at << http://www.cparity.com/projects/AcmClassification/samples/365732.pdf >>, ACM Transactions on Mathematical Software (TOMS), vol. 26, No. 4, Dec. 2000.

Hanisch, et al., "Co-clustering of Biological Networks and Gene Expression Data", Retrieved at << http://bioinformatics.oxfordjournals.org/cgi/content/abstract/18/suppl_1/S145 >>, Bioinformatics, vol. 18, No. suppl_1, Jul. 1, 2002.

Hofmann, et al., "Learning from Dyadic Data", Retrieved at << http://66.102.9.132/search?q=cache:xnrPEK_MBTkJ:citeseerx.ist.psu.edu/viewdoc/download%3Fdoi%3D10.1.1.61.4810%26rep%3Drep1%26type%3Dpdf+Learning+from+Dyadic+Data&cd=1&hl=en&ct=clnk >>, Proceedings of the 1998 conference on Advances in neural information processing systems II, 1999.

Järvelin, et al., "Cumulated Gain-Based Evaluation of IR Techniques", Retrieved at << http://www.info.uta.fi/ tutkimus/fire/archive/KJJK-nDCG.pdf >>, ACM Transactions on Information Systems (TOIS), vol. 20, No. 4, Oct. 2002.

Kanjani, Khushboo., "Parallel Non Negative Matrix Factorization for Document Clustering", Retrieved at << http://docs.google.com/viewer?a=v&q=cache:IOOv2tgi6B8J:citeseerx.ist.psu.edu/viewdoc/download%3Bjsessionid%3DEF434BCCAF20D1F2EEDA09EF59D21357%3Fdoi%3D10.1.1.83.813%26rep%3Drep1%26type% 3Dpdf+Parallel+Non+Negative+Matrix+Factorization+for+Document+Clustering&hl=en&sig=AHIEtbSEfq4fef-V4ey0H-2M5NJoT53yrg >>, May 7, 2007.

Kim, et al., "Fast Newton-type Methods for the Least Squares Nonnegative Matrix Approximation Problem", Retrieved at << http://www.siam.org/proceedings/datamining/2007/dm07_031kim.pdf >>, In Data Mining, Proceedings of SIAM Conference on, 2007.

Kim, et al., "Fast Projection Based Methods for the Least Squares Nonnegative Matrix Approximation Problem", Retrieved at << http://www.cs.utexas.edu/users/inderjit/public_papers/ls_nnma_jrnl.pdf >>, Statistical Analysis and Data Mining, vol. 1, No. 1, Feb. 2008.

Koren, et al., "Matrix Factorization Techniques for Recommender Systems", Retrieved at << http://www2.research.att.com/~volinsky/papers/ieeecomputer.pdf >>, Computer, vol. 42, No. 8, Aug. 2009.

Lee, et al., "Learning the Parts of Objects by Non-negative Matrix Factorization", Retrieved at << http://www.nature.com/nature/journal/v401/n6755/abs/401788a0.html >>, Nature 401, Oct. 21, 1999.

Lee, et al., "Algorithms for Non-negative Matrix Factorization", Retrieved at << http://hebb.mit.edu/people/seung/papers/nmfconverge.pdf >>, In Neural Information Processing Systems (NIPS), vol. 13, 2001.

Li, et al., "Learning Spatially Localized, Parts-based Representation", Retrieved at << http://66.102.9.132/search?q=cache:cHTHJl1nMx8J:cvl.ice.cycu.edu.tw/meeting/2008.12.02.pdf+Learning+Spatially+Localized,+Parts-based+Representation&cd=1&hl=en&ct=clnk >>, Computer Vision and Pattern Recognition, CVPR 2001, Proceedings of the 2001 IEEE Computer Society Conference on, vol. 1, Apr. 15, 2003.

Li, et al., "Learning Tag Relevance by Neighbor Voting for Social Image Retrieval", Retrieved at << http://staff.science.uva.nl/~xirong/pub/MIR08.pdf >>, International Multimedia Conference, Proceeding of the 1st ACM international conference on Multimedia information retrieval, Oct. 30-31, 2008.

Liu, et al., "Browserank: Letting Web Users Vote for Page Importance", Retrieved at << http://www.eldoradoseo.com/wp-content/SEO-PDFS/BrowseRank-SEO.pdf >>, Annual ACM Conference on Research and Development in Information Retrieval, Proceedings of the 31st annual international ACM SIGIR conference on Research and development in information retrieval, Jul. 20-24.

Nelder, et al., "Generalized Linear Models", Retrieved at << http://www.jstor.org/pss/2344614 >>, Journal of the Royal Statistical Society. Series A (General), vol. 135, No. 3, 1972.

Gropp, William., "Parallel Programming with MPI", Retrieved at << http://www.cecalc.ula.ve/adiestramiento/eventos/HPCLC/slides/day_04/mpi-half-day.pdf >>, Oct. 29, 2003.

Rennie, et al., "Fast Maximum Margin Matrix Factorization for Collaborative Prediction", Retrieved at << http://66.102.9.132/search?q=cache%3Ai8a7wtHHYhsJ%3Aciteseerx.ist.psu.edu%2Fviewdoc%2Fdownload%3Fdoi%3D10.1.1.71.9972%26rep%3Drep1%26type%3Dpdf+Fast+maximum+margin+matrix+factorization+for+collaborative+prediction&hl=en >>, ACM International Conference Proceeding Series, vol. 119, Proceedings of the 22nd international conference on Machine learning, Aug. 7-11, 2005.

Robila, et al., "A Parallel Unmixing Algorithm for Hyperspectral Images", Retrieved at << http://pages.csam.montclair.edu/~robila/RSL/Papers/spie06_pap.pdf >>, Proceedings—SPIE The International Society for Optical Engineering, International Society for Optical Engineering, vol. 6384, 2006.

Schmidt, et al., "Bayesian Non-negative Matrix Factorization", Retrieved at << http://mikkelschmidt.dk/index.php?id=8&tx_ttnews%5Btt_news%5D=40&tx_ttnews%5BbackPid%5D=5&cHash=d0d2a39572 >>, Independent Component Analysis and Signal Separation, International Conference on, Lecture Notes in Computer Science (LNCS), vol. 5441, 2009.

Singh, et al., "A Unified View of Matrix Factorization Models", Retrieved at << http://www.springerlink.com/content/lh5217g12022k501/fulltext.pdf?page=1 >>, Lecture Notes in Artificial Intelligence, Proceedings of the European conference on Machine Learning and Knowledge Discovery in Databases—Part II, vol. 5212, Sep. 15-19, 2008.

Sra, et al., "Nonnegative Matrix Approximation: Algorithms and Applications", Retrieved at << http://66.102.9.132/search?q=cache:UHaKknQ2q_wJ:citeseerx.ist.psu.edu/viewdoc/download%3Fdoi%3D10.1.1.80.107%26rep%3Drep1%26type%3Dpdf+Nonnegative+matrix+approximation:+Algorithms+and+applications&cd=1&hl=en&ct=clnk >>, Jun. 21, 2006.

Wang, et al., "PLDA: Parallel Latent Dirichlet Allocation for Large-Scale Applications", Retrieved at << http://alumni.cs.ucsb.edu/~wychen/publications/aaim09.pdf >>, In Proceeding of 5th International Conference on Algorithmic Aspects in Information and Management (AAIM), Jun. 2009.

Yu, et al., "Fast Nonparametric Matrix Factorization for Large-Scale Collaborative Filtering", Retrieved at << http://www.cs.cmu.edu/~lafferty/pdfs/sigir469-yu.pdf >>, Annual ACM Conference on Research and Development in Information Retrieval, Proceedings of the 32nd international ACM SIGIR conference on Research and development in information retrieval, Jul. 19-23, 2009.

* cited by examiner

FIG. 9

DISTRIBUTED NON-NEGATIVE MATRIX FACTORIZATION

BACKGROUND

The Internet abounds with dyadic data that continues to increase rapidly as new websites come online and existing websites add new content. Generally, dyadic data are the measurements on dyads, which are pairs of two elements coming from two sets. For instance, well-known dyadic data on the Internet is the term-by-document representation of the web corpus, where the measurement on the dyad (term, document) can be the count of how many times the term appears in the document, or some transformed value such as the TF (term frequency)-IDF (inverse document frequency) score.

In general, dyadic data shares the characteristics of high dimensionality, sparsity, non-negativeness, and dynamicity. In the term-by-document matrix, for example, its dimensions are usually very large (e.g., millions to billions), and the measurements are sparse relative to the all possible dyads, i.e., a term does not appear in all documents. Finally, most measurements on web dyadic data are non-negative in that the measurements are based on event observations (e.g., impressions and clicks), which are defined as positive, if observed, and zero, otherwise. Additionally, as new words are invented and new webpages are put into public every day, the term-by-document dyadic data continually grows in terms of both the observed dyads and the dimensionality.

A commonly used tool in extracting the underlying structure is matrix factorization. However, the application of matrix factorization on real-world web dyadic data poses a serious challenge to the scalability of available tools.

SUMMARY

The following presents a simplified summary in order to provide a basic understanding of some novel embodiments described herein. This summary is not an extensive overview, and it is not intended to identify key/critical elements or to delineate the scope thereof. Its sole purpose is to present some concepts in a simplified form as a prelude to the more detailed description that is presented later.

The disclosed architecture scales up the Non-negative Matrix Factorization (NMF) technique to a Distributed NMF (denoted DNMF) to handle large matrices, for example, on a web scale that can include millions and billions of data points. To analyze web-scale data, DNMF is applied through parallelism on distributed computer clusters, for example, with thousands of machines. In order to maximize the parallelism and data locality, matrices are partitioned along the short dimension, so that each partition corresponds to fewer cells. In other words, in an m×n matrix of m rows and n columns, where m<n, partitioning is performed along the columns.

The probabilistic DNMF can employ not only Gaussian and Poisson NMF techniques, but also exponential NMF for modeling web dyadic data (e.g., dwell time of a user on browsed web pages). By partitioning the data and arranging the computations to maximize data locality and parallelism as distributed across multiple machines, factorizing matrices with billions of non-zero cells, for example, can be accomplished within hours, whereas such tasks would be impossible to accomplish for data of such scale.

To the accomplishment of the foregoing and related ends, certain illustrative aspects are described herein in connection with the following description and the annexed drawings. These aspects are indicative of the various ways in which the principles disclosed herein can be practiced and all aspects and equivalents thereof are intended to be within the scope of the claimed subject matter. Other advantages and novel features will become apparent from the following detailed description when considered in conjunction with the drawings.

DETAILED DESCRIPTION

Non-negative matrix factorization (NMF) approximates a real m×n matrix A as a product of two non-negative matrices, W and H, where W has a dimension m×r and H has a dimension of r×n. (Note that regular uppercase letters are used to denote matrices, and boldface lowercase letters are used to denote vectors.) For example, $A \in \mathbb{R}_{+m \times n}$ is an m-by-n non-negative real matrix, an element (i,j) of which is denoted $A_{i,j}$. The set of indices of non-zero values in A is denoted as $\mathbb{O}_{i,j} = \{(i,j) | A_{i,j} > 0\}$, and similarly, define $\mathbb{O}_i = \{j | A_{i,j} > 0\}$ and $\mathbb{O}^j = \{i | A_{i,j} > 0\}$.

DEFINITION 1. (Non-negative Matrix Factorization). Given $A \in \mathbb{R}_{+m \times n}$ and a positive integer $k \leq \min\{m, n\}$, find $W \in \mathbb{R}_{+m \times k}$ and $H \in \mathbb{R}_{+k \times n}$ such that a divergence function $D(A \| \tilde{A})$ is minimized, where $\tilde{A} = WH$ is the reconstructed matrix from the factorization.

A probabilistic interpretation of NMF is to take $A_{i,j}$ as an observation from a distribution the mean of which is parameterized by $\tilde{A}_{i,j}$. Following is a brief description of two commonly-used NMFs, variations of which can be employed in the disclosed architecture. Thereafter, the exponential distribution for web lifetime data is described as well.

With respect to the Gaussian NMF using the following relationship, $$A_{i,j} \sim \text{Gaussian}(\tilde{A}_{i,j}, \sigma^2),$$

maximizing the likelihood of observing A with respect to W and H under an independently and identically distributed (i.i.d.) assumption using the following, $$L(W, H | A) = \prod_{(i,j)} \frac{1}{\sqrt{2\pi}\,\sigma} \exp\left\{-\frac{(A_{i,j} - \tilde{A}_{i,j})^2}{2\sigma^2}\right\}$$

is equivalent to minimizing $$\mathcal{D}(A \| \tilde{A}) = \sum_{(i,j)} (A_{i,j} - \tilde{A}_{i,j})^2 = \|A - WH\|^2,$$

which is the Euclidean distance that leads to the most popular form of NMF, referred to as the Gaussian NMF (GNMF).

Similarly, when the Poisson distribution is used to model count data (e.g., click counts), using the following relationship, $$A_{i,j} \sim \text{Poisson}(\tilde{A}_{i,j}),$$

then maximizing the likelihood of observing A using the following, $$L(W, H \mid A) = \prod_{(i,j)} \exp\{-(\tilde{A})_{i,j}\} \frac{(\tilde{A}_{i,j})^{A_{i,j}}}{A_{i,j}!}$$

is equivalent to minimizing $$\mathcal{D}(A \parallel \tilde{A}) = \sum_{(i,j)} (\tilde{A}_{i,j} - A_{i,j} \log(\tilde{A}_{i,j})),$$

which is the generalized Kullback-Leibler (KL)-divergence. The resulting NMF is referred to the Poisson NMF (PNMF).

Following is a table of updating formulae for multiplicative algorithms that iteratively find the solution W and H for both GNMF and PNMF (Table 1(a) and Table 1(b), respectively).

Throughout this description, ".*" and "./" (or equivalently "-") are used to denote element-wise matrix multiplication and division.

TABLE 1

NMFs based on Different Probabilistic Assumptions

| (a) Gaussian NMF (GNMF) | (b) Poisson NMF (PNMF) | (c) Exponential NMF (ENMF) |
|---|---|---|
| $A_{i,j} \sim \text{Gaussian}(\tilde{A}_{i,j}, \sigma^2)$ | $A_{i,j} \sim \text{Poisson}(\tilde{A}_{i,j})$ | $A_{i,j} \sim \text{Exponential}(\tilde{A}_{i,j})$ |
| $H \leftarrow H \cdot * \frac{W^T A}{W^T W H}$ (1) | $H \leftarrow H \cdot * \frac{W^T \frac{A}{WH}}{W^T E^1}$ (3) | $H \leftarrow H \cdot * \frac{W^T [A \cdot /(WH)^2]}{W^T [1 \cdot /WH]}$ (5) |
| $W \leftarrow W \cdot * \frac{A H^T}{W H H^T}$ (2) | $W \leftarrow W \cdot * \frac{\frac{A}{WH} H^T}{E H^T}$ (4) | $W \leftarrow W \cdot * \frac{[A \cdot /(WH)^2] H^T}{[1 \cdot /WH] H^T}$ (6) |

Note:
$E \in \mathbb{R}_{+ m \times n}$, $E_{i,j} = 1$

In addition to count and Gaussian data, another kind of measurement on dyads is the lifetime data. An example of lifetime data in the web context is the dwell time of a user on a webpage (i.e., the time until the user navigates away from the page).

Lifetime can be modeled by the Weibull distribution, $$f(x \mid \gamma, \beta) = \frac{\gamma}{\beta} x^{\gamma-1} e^{-x^\gamma/\beta}.$$

Since the mean $$E(X) = \beta^{1/\gamma} \Gamma\left(1 + \frac{1}{\gamma}\right)$$

of the Weibull distribution involves two parameters, and hence, cannot be parameterized by a single value $\tilde{A}_{i,j}$, the Exponential distribution is considered instead, which is a special case of the Weibull distribution with $\gamma=1$ and $E(X)=\beta$.

When $A_{i,j}$ is assumed to come from an Exponential distribution with $\beta = \tilde{A}_{i,j}$, using the following, $$A_{i,j} \sim \text{Exponential}(\tilde{A}_{i,j}),$$

maximizing the likelihood of observing A with respect to W and H $$L(W, H \mid A) = \prod_{(i,j)} \frac{1}{\tilde{A}_{i,j}} \exp\left\{-\frac{A_{i,j}}{\tilde{A}_{i,j}}\right\}$$

is equivalent to minimizing $$\mathcal{D}(A \parallel \tilde{A}) = \sum_{(i,j)} \left(\log(\tilde{A}_{i,j}) + \frac{A_{i,j}}{\tilde{A}_{i,j}}\right).$$

A gradient-descent algorithm is used to find the solution. Matrix calculus reveals that the gradient of $\mathcal{D}(A \parallel \tilde{A})$ with respect to H is $$\frac{\partial \mathcal{D}}{\partial H} = W^T \left[\frac{1}{WH} - \frac{A}{(WH)^{.2}}\right],$$

which leads to the following update formula, $$H \leftarrow H + \mu \cdot * W^T \left[\frac{A}{(WH)^2} - \frac{1}{WH}\right]$$

and $\mu > 0$ is the step-size. When $\mu$ takes $$\frac{H}{W^T [1 \cdot / WH]},$$

the multiplicative updating rule for the Exponential NMF (ENMF) is obtained as $$H \leftarrow H \cdot * \frac{W^T [A \cdot /(WH)^2]}{W^T [1 \cdot / WH]}$$

which, together with the formula for W, is summarized in Table 1(c) above for comparison with the GNMF and the PNMF. The proof of convergence for PNMF using Equations 5 and 6 of the table is similar to the proof for GNMF, and thus, is not shown, for brevity.

The disclosed architecture scales up the NMF technique to a distributed NMF (denoted DNMF) to handle large matrices, for example, on a web scale that can include millions and billions of data points. To analyze web-scale data, DNMF is applied through parallelism on distributed computer clusters, for example, with thousands of machines. In order to maximize the parallelism and data locality, matrices are partitioned along the short dimension, rather than the long dimension as done conventionally. The probabilistic DNMF can employ not only Gaussian and Poisson NMF techniques, but also Exponential NMF for modeling web dyadic data (e.g., dwell time of a user on browsed web pages).

Reference is now made to the drawings, wherein like reference numerals are used to refer to like elements throughout. In the following description, for purposes of explanation, numerous specific details are set forth in order to provide a thorough understanding thereof. It may be evident, however, that the novel embodiments can be practiced without these specific details. In other instances, well known structures and devices are shown in block diagram form in order to facilitate a description thereof. The intention is to cover all modifications, equivalents, and alternatives falling within the spirit and scope of the claimed subject matter.

Figure 1:
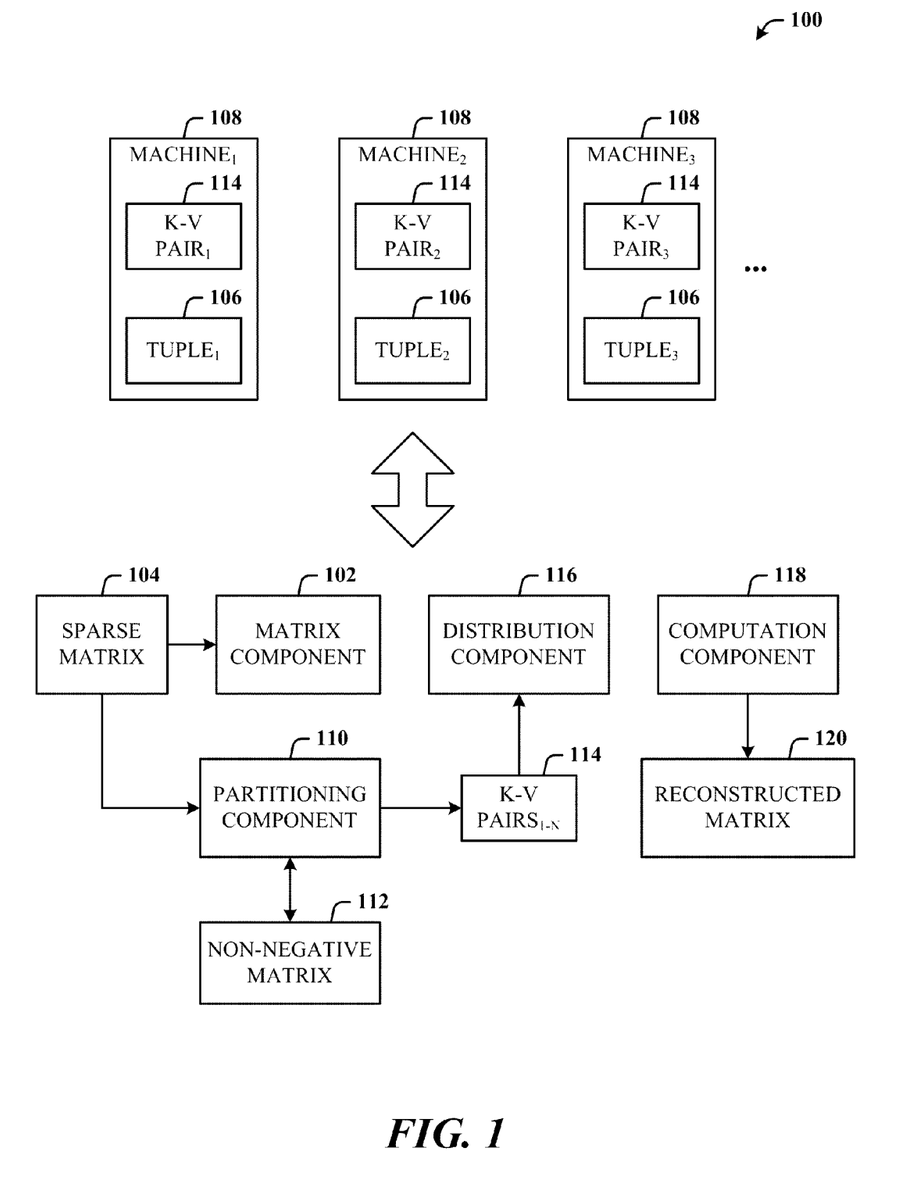
FIG. 1 illustrates a computer-implemented data processing system in accordance with the disclosed architecture.

FIG. 1 illustrates a computer-implemented data processing system 100 in accordance with the disclosed architecture. The system 100 includes a matrix component 102 that represents a sparse (non-negative) matrix 104 of dyadic data as tuples 106 distributed across a cluster of machines 108. A partitioning component 110 partitions a non-negative matrix 112 along the short dimension into key-value pairs 114. Note that sparse matrix 104 is partitioned differently than W and H, and thus, can employ a different partitioning component than partitioning component 110. However, it is to be understood that the partitioning component 110 can include such capabilities as well. The non-negative matrix 112 is factored from the sparse matrix 104 according to probabilistic non-negative matrix factorization (NMF). A distribution component 116 distributes the key-value pairs 114 across the cluster of machines 108. A computation component 118 can be employed to compute a reconstructed matrix 120 based on a global summation of partial sums of the distributed key-value pairs 114 and distributed tuples 106.

The probabilistic NMF can be a Gaussian NMF employed to model Gaussian data. The probabilistic NMF can be a Poisson NMF employed to model Poisson data (e.g., count data). The probabilistic NMF can be an exponential NMF employed to model exponential data (e.g., lifetime dyadic data). The computation component 118 facilitates element-wise division and element-wise multiplication as distributed across the multiple machines 108. The dyadic data can be web search data that includes term-and-clicked-link tuples, and the NMF is applied to smooth a matrix of the tuples to elevate search relevance.

Figure 2:
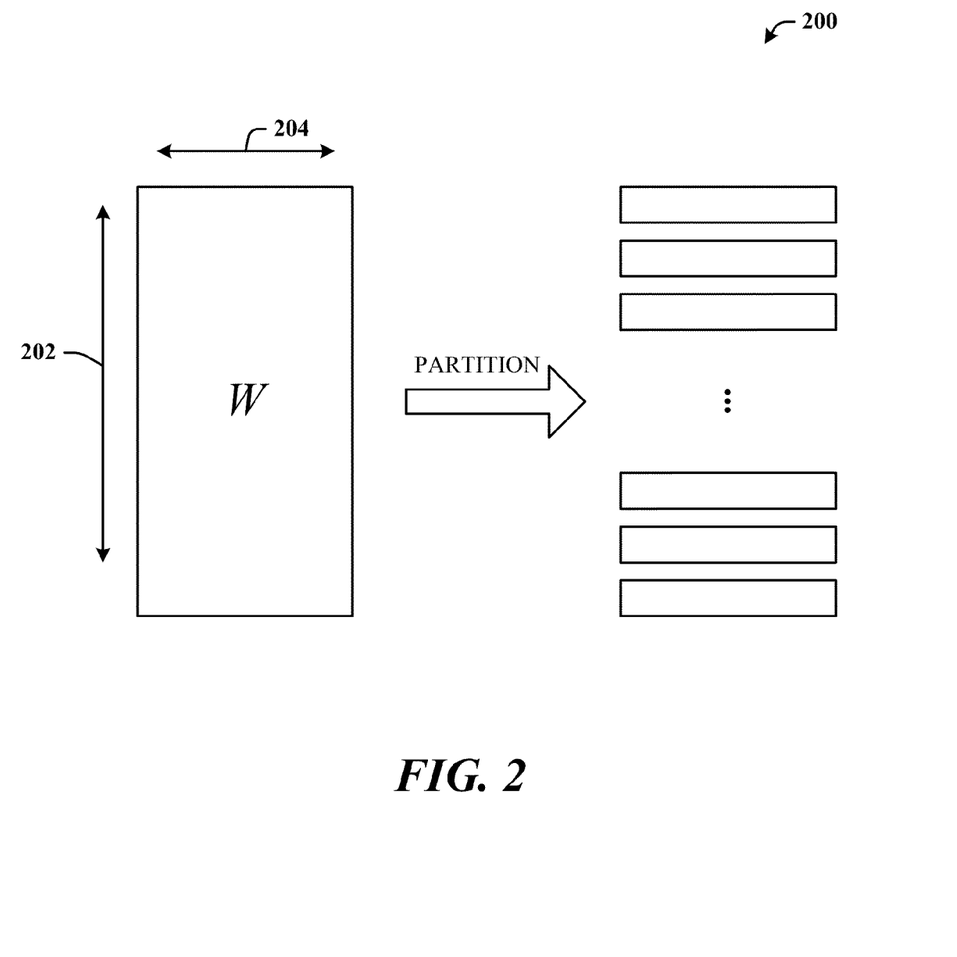
FIG. 2 illustrates a partitioning scheme that partitions a matrix W along the short dimension.

FIG. 2 illustrates a partitioning scheme 200 that partitions a matrix W along the short dimension 202. The scheme 200 supports distributed NMF as described herein by facilitating the parallel computation of both $W^T A$ and $W^T W$, as well as data locality for local processing, thereby reducing communications costs that would otherwise be incurred when partitioning the matrix W, which is a non-negative matrix, along the long dimension 204. Although not illustrated, the scheme 200 applies equally well to partitioning the non-negative matrix H along the short dimension.

Figure 3:
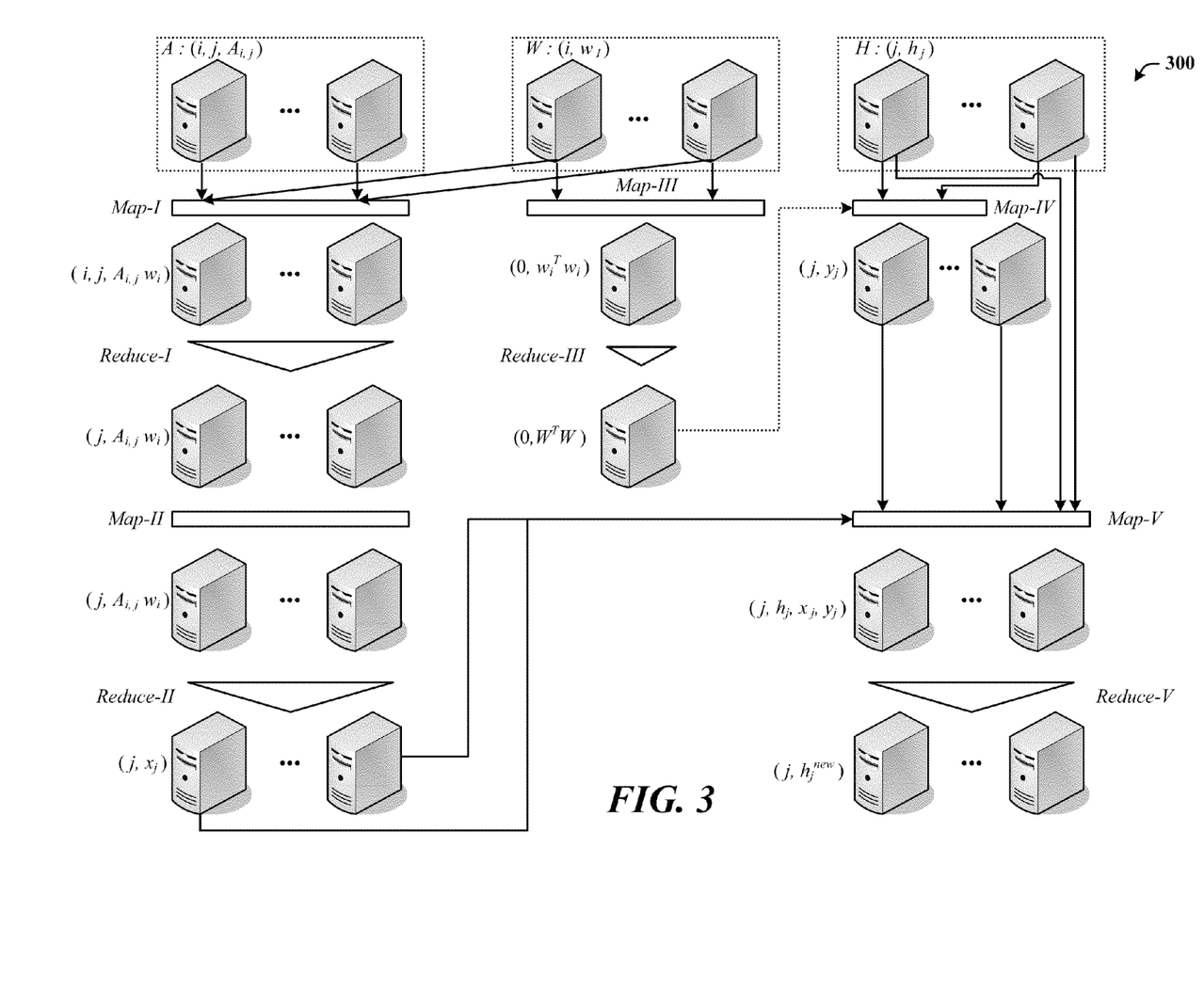
FIG. 3 illustrates an exemplary implementation of the disclosed architecture to a software framework.

FIG. 3 illustrates an exemplary implementation of the disclosed architecture to a software framework 300. Here, the software framework is called MapReduce. However, this is not to be construed as limiting in any way, in that the architecture can also be applied to other frameworks such as MPI (message passing interface) clusters, for example.

MapReduce is a programming model and associated infrastructure that provides automatic and reliable parallelization once a computation task is expressed as a series of Map and Reduce operations. Specifically, the Map function reads a <key, value> pair, and emits one or many intermediate <key, value> pairs. The MapReduce infrastructure then groups all values with the same intermediate key, and constructs a <key, ValueList> pair with ValueList containing all values associated with the same key. The Reduce function takes a <key, ValueList> pair and emits one or many new <key, value> pairs. As both Map and Reduce operate on <key, value> pairs, a series of mappers (for multiplications) and reducers (for summations of data received from the mappers) are usually streamlined for complicated tasks. With the MapReduce infrastructure, a user can fully focus on the logic of mappers and reducers, and let the infrastructure deal with complex issues about distributed computing.

Despite the updating formulae illustrated in Table 1, it is still a nontrivial task to distribute NMF on MapReduce clusters. The giant matrices A, W, and H need to be carefully partitioned so that each partition can be efficiently shuffled across machines, when needed. Additionally, the computation needs to be arranged properly such that most computation can be carried out locally and in parallel.

Following is a description of how to partition the matrices, and then how to scale up GNMF on MapReduce. The description then moves to adapting the scaling-up scheme for GNMF to PNMF and ENMF. The updating formulae are symmetric between W and H; thus, the description is limited to the update of H.

With respect to matrix partition schemes, since matrix A is sparse, the matrix can be represented as $(i,j,A_{i,j})$ tuples that are spread across machines. For dense matrices W and H, how to partition such matrices significantly affects the final scalability.

Existing work on parallel NMF chooses to partition W and H along the long dimension. This may be a sensible choice that conforms to the conventional thinking of matrix multiplication in the context of computing $W^T A$ and $W^T W$ (Equation (1) of Table 1). By partitioning W and H along the long dimension and assuming A is in the shared memory, different threads can compute corresponding rows of $W^T A$ on different cores of a multi-core machine. Similarly, as all columns of W are held in the shared memory, $W^T W$ can be also calculated in parallel.

However, partitioning matrices W and H along the long dimension does not prevail for distributed NMF. First, each column of W can be simply too large to be manipulated in memory, and also too big to be passed around across machines. Second, partitioning along the long dimension unnecessarily limits the maximum parallelism to the factorization dimensionality k as there are only k columns in W. Finally, when partitioning W along the long dimension, $W^T A$ and $W^T W$ can no longer be computed in parallel because it can no longer be assumed that A and all columns of W can be accessible with low overhead.

Accordingly, to address these limitations, the disclosed architecture partitions the matrices W and H along the short dimension as illustrated in FIG. 2. This way of partitioning not only enables the parallel computation of both $W^T A$ and $W^T W$ but also maximizes the data locality to minimize the communication cost. More specifically, this partitioning technique renders the following view of W and H $$W = \begin{pmatrix} w_1 \\ w_2 \\ \vdots \\ w_m \end{pmatrix} \text{ and } H = (h_1 \ h_2 \ \ldots \ h_n), \quad (9)$$

where $w_i$ ($1 \leq i \leq m$) and $h_j$ ($1 \leq j \leq n$) are k-dimensional row and column vectors, respectively. Consequently, W and H are stored as sets of $<i,w_i>$ and $<j,h_j>$ key-value pairs.

The updating formula for H (Equation (1) in Table 1) is composed of three components: $X=W^T A$, $Y=W^T WH$, and $H \leftarrow H.* X./Y$, where X and Y are auxiliary matrices for notation convenience (X is a first auxiliary matrix of the auxiliary matrices X and Y, and Y is a second auxiliary matrix of the auxiliary matrices X and Y). The three components are described herein below. FIG. 3 illustrates a flow diagram of updating H on MapReduce clusters.

With respect to computing $X=W^T A$, let $x_j$ denote the jth column of X, then, $$x_j = \sum_{i=1}^m A_{i,j} w_i^T = \sum_{i \in \mathbb{O}^j} A_{i,j} w_i^T.$$

which indicates that $x_j$ is a linear combination of $\{w_i^T\}$ over the non-zero cells on the jth column of matrix A, and which can be implemented by the following two sets of MapReduce operations.

Map-I: Map $<i,j,A_{i,j}>$ and $<i,w_i>$ on i such that tuples with the same i are shuffled to the same machine in the form of $<i, \{w_i, (j, A_{i,j}) \forall j \in \mathbb{O}_i\}>$.

Reduce-I: Take $<i, \{w_i, (j, A_{i,j}) \forall j \in \mathbb{O}_i\}>$ and emit $<j, A_{i,j} w_i^T>$ for each $j \in \mathbb{O}_i$.

Map-II: Map $<j, A_{i,j} w_i^T>$ on j such that tuples with the same j are shuffled to the same machine in the form of $<j, \{A_{i,j} w_i^T\} \forall i \in \mathbb{O}^j\}>$.

Reduce-II: Take $<j, \{A_{i,j} w_i^T\} \forall i \in \mathbb{O}^j\}>$, and emit $<j, x_j>$, where $x_j = \sum_{i \in \mathbb{O}^j} A_{i,j} w_i^T$.

The output from Reduce-II is the matrix X. The technique of using two MapReduce operations can be used to multiply any two giant matrices when one is sparse and the other narrow. Multiplying two giant and dense matrices is uncommon in practice because the result will take too much storage to be practical.

With respect to computing $Y=W^T WH$, it is desired to compute Y by first computing $C=W^T W$ and then $Y=CH$ to maximize the parallelism while requiring fewer multiplications than $Y=W^T(WH)$. It is unrealistic to compute WH because the result is a giant dense matrix that will easily overrun the storage.

With the partition of W along the short dimension, the calculation of $W^T W$ can be fully parallelized since, $$W^T W = \sum_{i=1}^m w_i^T w_i.$$

This means that each machine can first compute $w_i^T w_i$ (a small k×k matrix) for all the $w_i$'s the machine hosts, and then send the $w_i$'s for a global summation, as implemented by Map-III: Map $<i,w_i>$ to $<0, w_i^T w_i>$ where 0 is a dummy key value for data shuffling.

Reduce-III: Take $<0, \{w_i^T w_i\}_{i=1}^m>$, and emit $\Sigma_{i=1}^m w_i^T w_i$, which is the $W^T W$.

As summation is both associative and commutative, a combiner can be used to compute the partial sum of $w_i^T w_i$ on each machine and then pass the partial sum to the reducer to reduce network traffic.

Now that $C=W^T W$ is calculated, computing $Y=CH$ becomes as trivial as running through the following mapper with no data shuffled, except copying the k×k matrix C to all the machines that host $h_j$'s (as indicated by the dotted line in FIG. 2).

Map-IV: Map $<j,h_j>$ to $<j, y_j = Ch_j>$.

With respect to updating $H=H.*X./Y$, updating $H \leftarrow H.*X./Y$ is parallelized through the following MapReduce operation.

Map-V: Map $<j,h_j>$, $<j,x_j>$ and $<j,y_j>$ on j such that tuples with the same j are shuffled to the same machine in the form of $<j, \{h_j, x_j, y_j\}>$.

Reduce-V: Take $<j, \{h_j, x_j, y_j\}>$ and emit $<j, h_j^{new}>$, where $h_j^{new} = h_j.*x_j./y_j$.

This completes the update of H. Updating W can be carried out in the same fashion. The following describes how the above scaling-up scheme carries over to PNMF and ENMF.

Since the updating formulae of PNMF and ENMF share the same structure as GNMF, the challenges in distributed PNMF and ENMF still lie on how to compute the numerator X and the denominator Y. Once X and Y are computed, the same Map-V and Reduce-V can be re-used for the final update.

With respect to distributed PNMF, computing the numerator $X=W^T[A./(WH)]$ for PNMF is similar to GNMF, since once $\hat{A}=A./[WH]$ is computed, $X=W^T \hat{A}$ is known. Moreover, since $\hat{A}_{i,j}=0$, if $A_{i,j}=0$, $\hat{A}$ can be computed through two sets of MapReduce operations: the first operation gets $<i,j,A_{i,j},h_j>$ and the second operation obtains $<i,j,A_{i,j}/(w_i h_j)>$.

In computing $W^T \hat{A}$, two more MapReduce operations are no longer needed, since A was joined with W in the last step. Rather, $<j,[A_{i,j}/(w_i h_j)] w_i>$ can be output from the last step and the output streamlined directly to Map-II. Not only does this save some time, but it also reduces the network traffic.

The denominator $Y=WE$ appears formidable because two giant dense matrices are multiplied. However, since all elements of E are one, all the columns of Y are the same: $y_j = \Sigma_{i=1}^m w_i^T, \forall j \in [1, m]$. Thus, only one column is calculated in parallel, and the column can be copied to all the machines that host $h_j$'s for the update of H. The distributed PNMF can be implemented on MapReduce.

With respect to distributed ENMF, the computation of the numerator for ENMF is essentially the same as that for PNMF, and the same optimization to save one set of MapReduce operations applies as well. However, the denominator presents a challenge because it explicitly asks for the giant dense matrix 1./(WH). The denominator can be approximated by only keeping the cells corresponding to non-zero values of A.

Included herein is a set of flow charts representative of exemplary methodologies for performing novel aspects of the disclosed architecture. While, for purposes of simplicity of explanation, the one or more methodologies shown herein, for example, in the form of a flow chart or flow diagram, are shown and described as a series of acts, it is to be understood and appreciated that the methodologies are not limited by the order of acts, as some acts may, in accordance therewith, occur in a different order and/or concurrently with other acts from that shown and described herein. For example, those skilled in the art will understand and appreciate that a methodology could alternatively be represented as a series of interrelated states or events, such as in a state diagram. Moreover, not all acts illustrated in a methodology may be required for a novel implementation.

Figure 4:
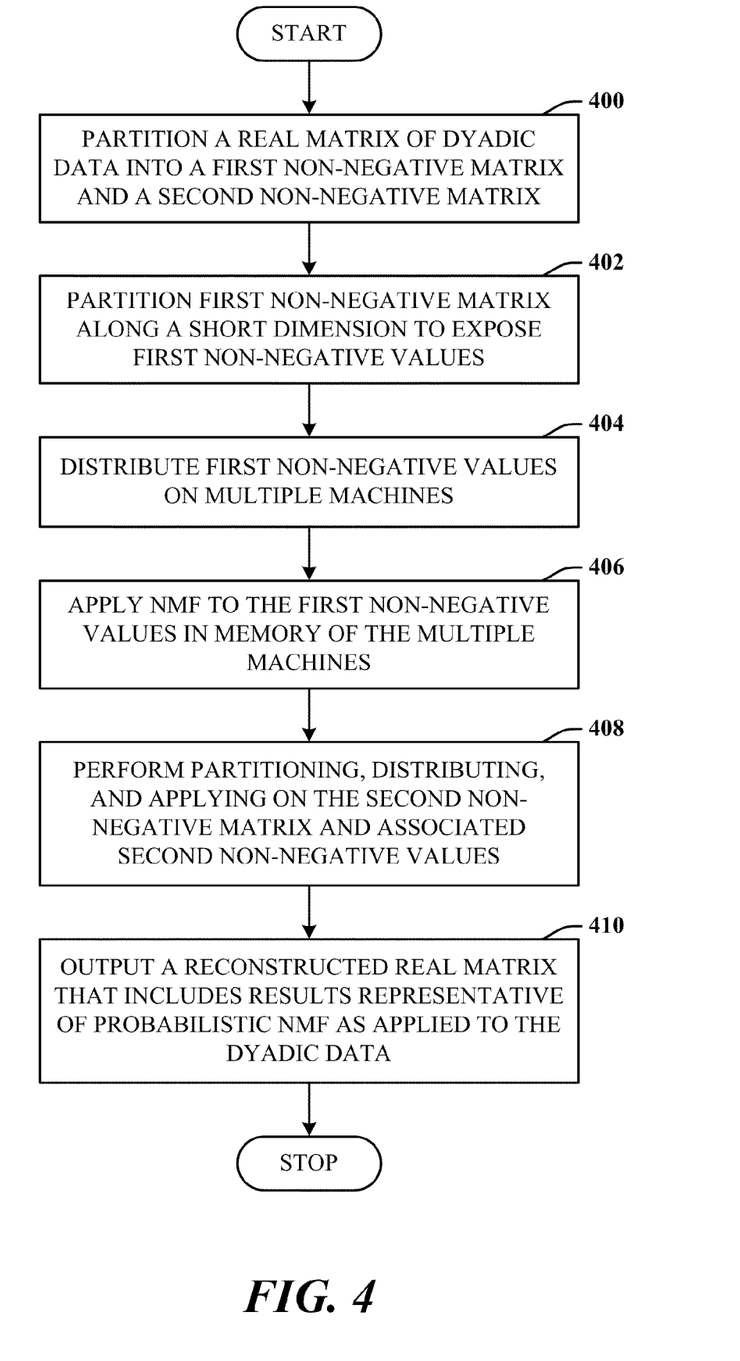
FIG. 4 illustrates a computer-implemented data processing method in accordance with the disclosed architecture.

FIG. 4 illustrates a computer-implemented data processing method in accordance with the disclosed architecture. At 400, a real matrix of dyadic data is partitioned into a first non-negative matrix and a second non-negative matrix. At 402, the first non-negative matrix is partitioned along a short dimension to provide first non-negative values. At 404, the first non-negative values are distributed on multiple machines. At 406, NMF is applied to the first non-negative values in memory of the multiple machines. At 408, the second non-negative matrix and associated second non-negative values are the partitioned, distributed, and the NMF applied (as for the first non-negative matrix). At 410, a reconstructed real matrix is output that includes results representative of probabilistic NMF as applied to the dyadic data.

Figure 5:
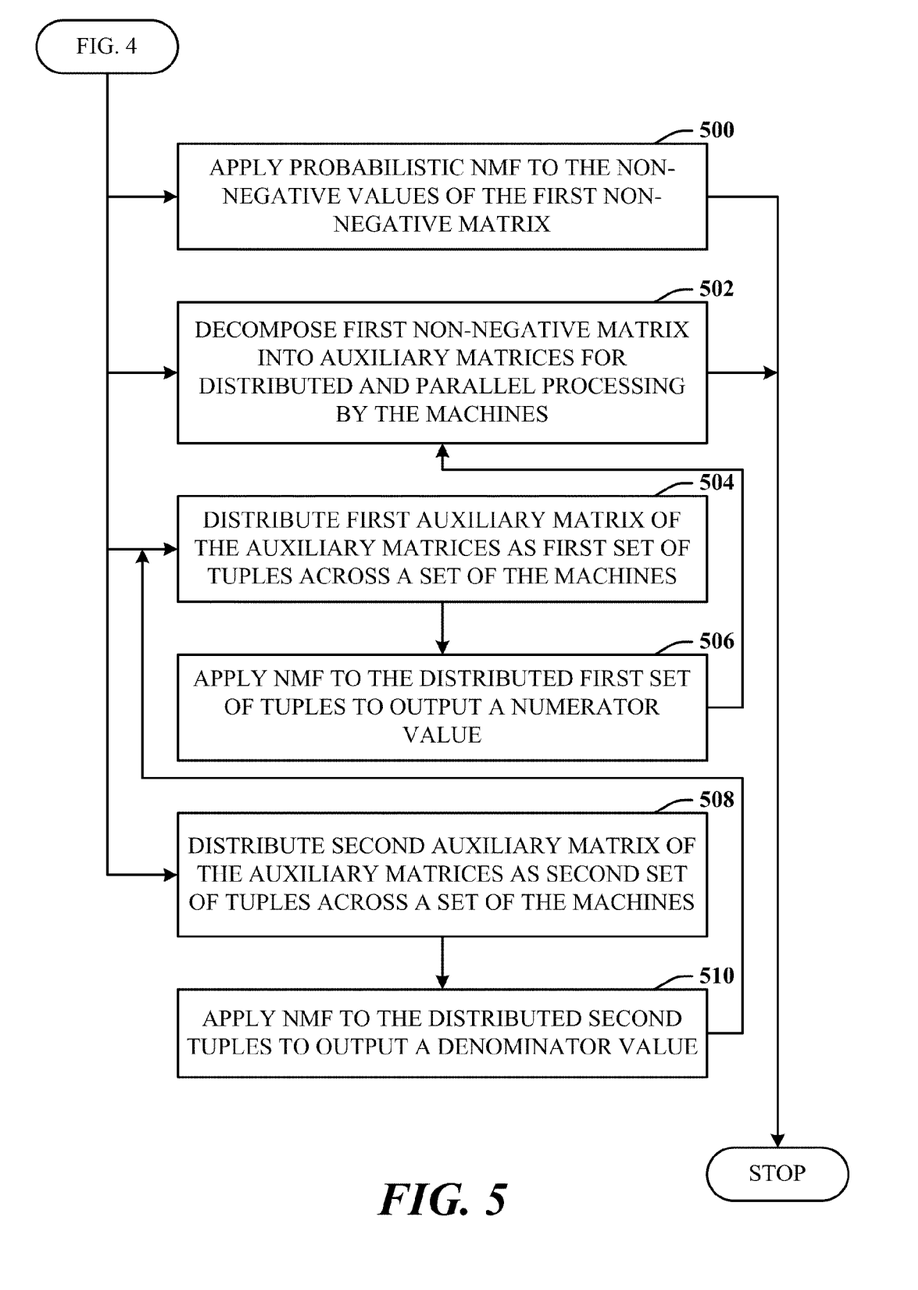
FIG. 5 illustrates further aspects of the method of FIG. 4.

FIG. 5 illustrates further aspects of the method of FIG. 4. At 500, a probabilistic NMF is applied to the non-negative values of the first non-negative matrix. At 502, the first non-negative matrix is decomposed into auxiliary matrices for distributed and parallel processing by the machines. At 504, a first auxiliary matrix (X) of the auxiliary matrices is distributed as a first set of tuples across a set of the machines. At 506, NMF is applied to the distributed first set of tuples to output a numerator value. At 508, a second auxiliary matrix (Y) of the auxiliary matrices is distributed as a second set of tuples across a set of the machines. At 510, NMF is applied to the distributed second tuples to output a denominator value.

Figure 6:
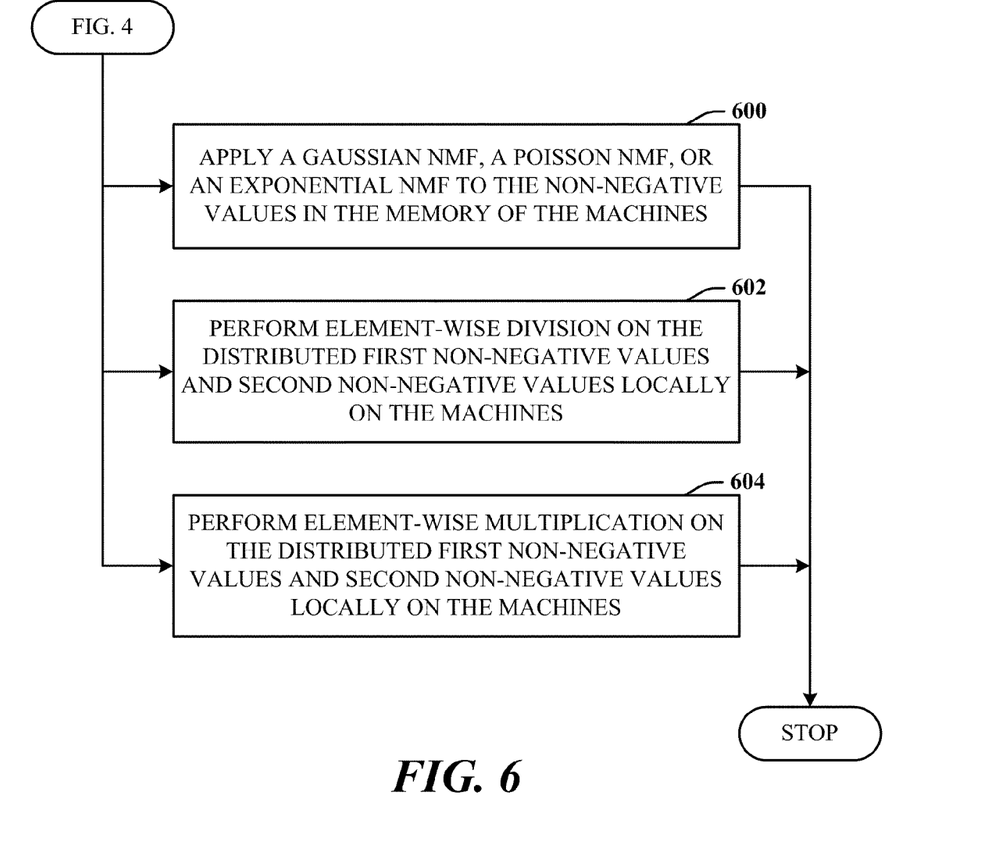
FIG. 6 illustrates further aspects of the method of FIG. 4.

FIG. 6 illustrates further aspects of the method of FIG. 4. At 600, a Gaussian NMF, a Poisson NMF, or an Exponential NMF is applied to the non-negative values in the memory of the machines. At 602, element-wise division is performed on the distributed first non-negative values and second non-negative values locally on the machines. At 604, element-wise multiplication is performed on the distributed first non-negative values and second non-negative values locally on the machines.

Figure 7:
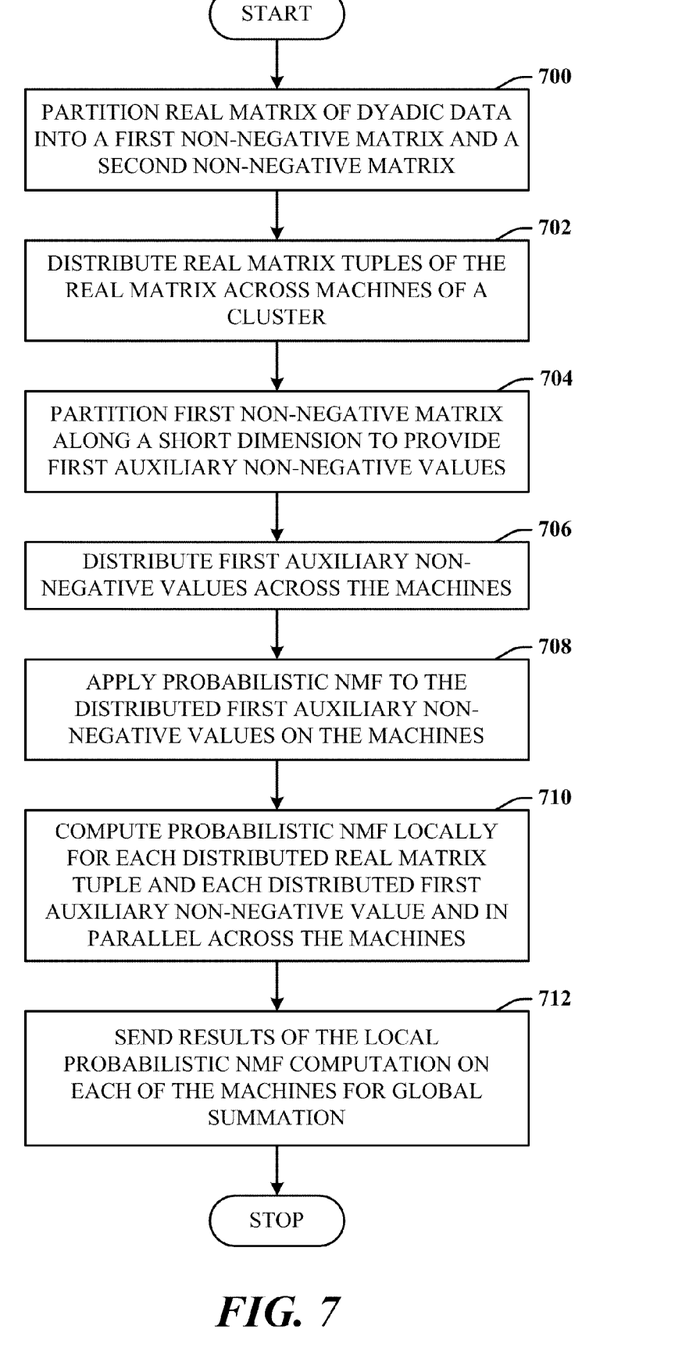
FIG. 7 illustrates an alternative data processing method.

FIG. 7 illustrates an alternative data processing method. At 700, a real matrix of dyadic data is partitioned into a first non-negative matrix and a second non-negative matrix. At 702, real matrix tuples of the real matrix are distributed across machines of a cluster. At 704, the first non-negative matrix is partitioned along the short dimension to provide the first auxiliary non-negative values. At 706, the first auxiliary non-negative values are distributed across the machines. At 708, probabilistic NMF is applied to the distributed first auxiliary non-negative values on the machines. At 710, the probabilistic NMF is computed locally for each distributed real matrix tuple and each distributed first auxiliary non-negative value and in parallel across the machines. At 712, results of the local probabilistic NMF computation on each of the machines are sent for global summation.

Figure 8:
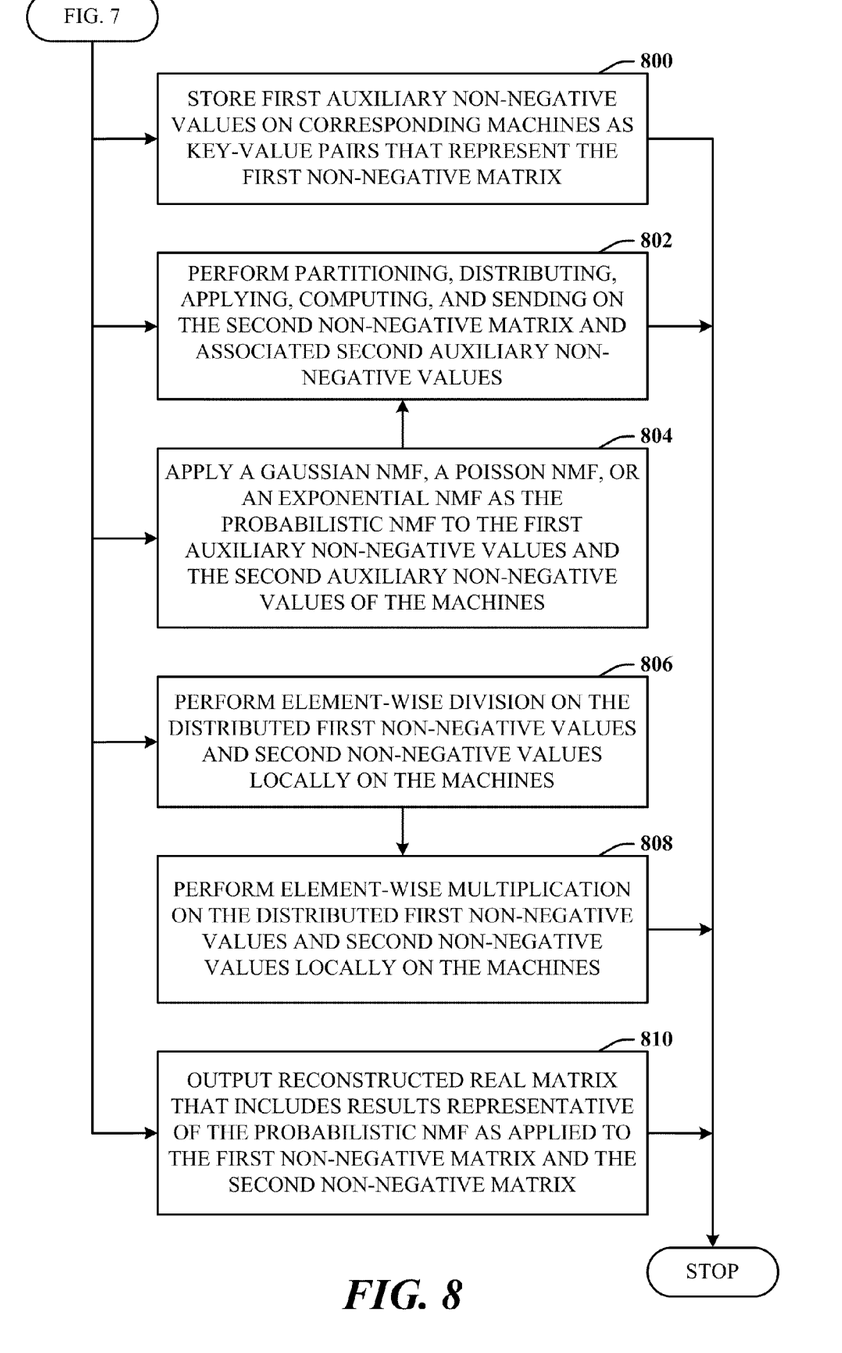
FIG. 8 illustrates further aspects of the method of FIG. 7.

FIG. 8 illustrates further aspects of the method of FIG. 7. At 800, the first auxiliary non-negative values are stored on corresponding machines as key-value pairs that represent the first non-negative matrix. At 802, partitioning, distributing, applying, computing, and sending are performed on the second non-negative matrix and associated second auxiliary non-negative values. At 804, a Gaussian NMF, a Poisson NMF, or an Exponential NMF is applied as the probabilistic NMF to the first auxiliary non-negative values and the second auxiliary non-negative values of the machines. At 806, element-wise division is performed on the distributed first non-negative values and second non-negative values locally on the machines. At 808, element-wise multiplication is performed on the distributed first non-negative values and second non-negative values locally on the machines. At 810, a reconstructed real matrix is output that includes results representative of the probabilistic NMF as applied to the first non-negative matrix and the second non-negative matrix.

The versatility of the disclosed DNMF architecture can be applied to dyadic data for web search as well, by factorizing the (term, clicked URL) dyadic data, for example. Search terms and associated clicked URLs are a commonly used data source for learning-to-rank systems: this tuple can be fed into a learning-to-rank system as features to help train a better ranker.

As used in this application, the terms "component" and "system" are intended to refer to a computer-related entity, either hardware, a combination of software and tangible hardware, software, or software in execution. For example, a component can be, but is not limited to, tangible components such as a processor, chip memory, mass storage devices (e.g., optical drives, solid state drives, and/or magnetic storage media drives), and computers, and software components such as a process running on a processor, an object, an executable, module, a thread of execution, and/or a program. By way of illustration, both an application running on a server and the server can be a component. One or more components can reside within a process and/or thread of execution, and a component can be localized on one computer and/or distributed between two or more computers. The word "exemplary" may be used herein to mean serving as an example, instance, or illustration. Any aspect or design described herein as "exemplary" is not necessarily to be construed as preferred or advantageous over other aspects or designs.

Figure 9:
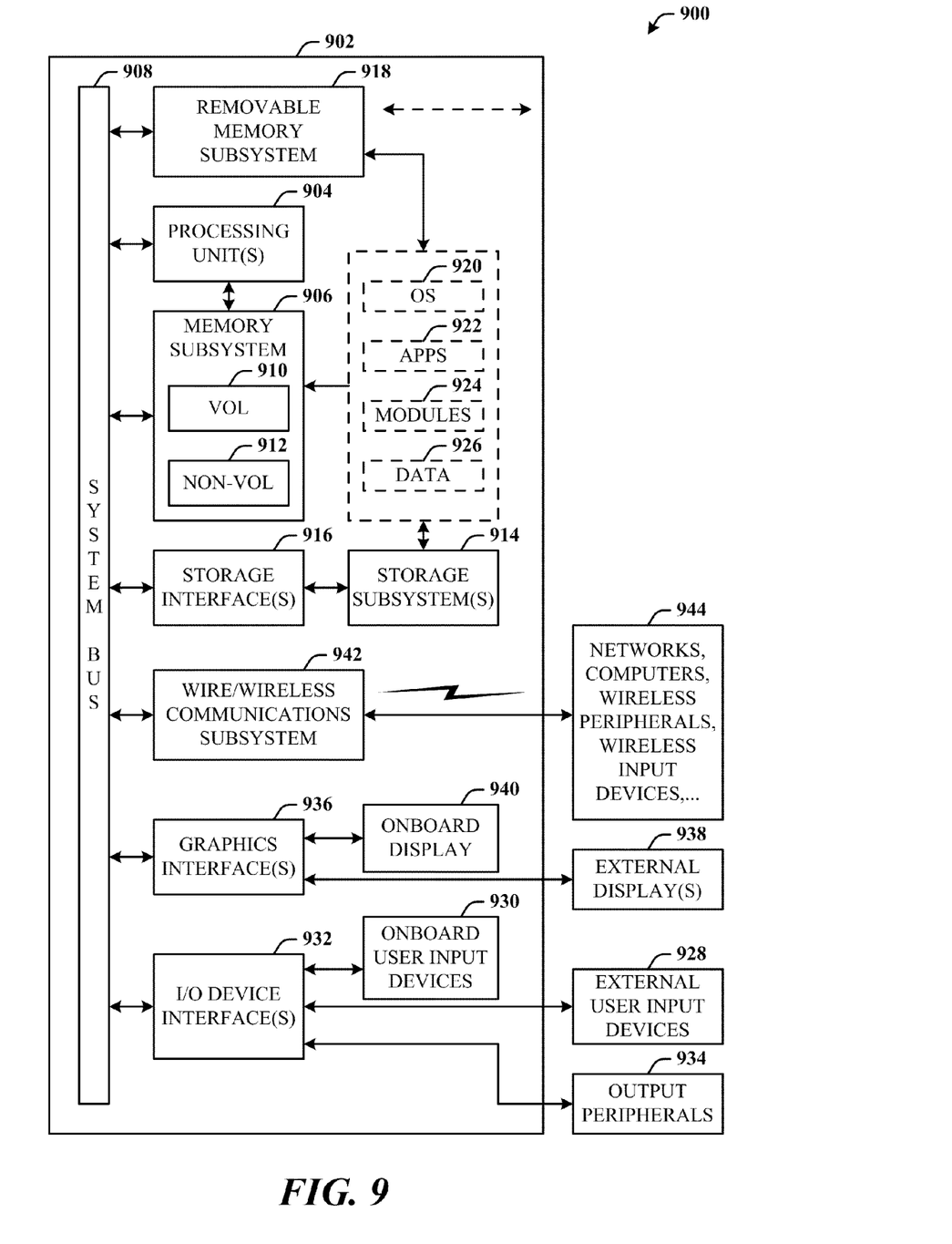
FIG. 9 illustrates a block diagram of a computing system that executes distributed non-negative matrix factorization in accordance with the disclosed architecture.

Referring now to FIG. 9, there is illustrated a block diagram of a computing system 900 that executes distributed non-negative matrix factorization in accordance with the disclosed architecture. In order to provide additional context for various aspects thereof, FIG. 9 and the following description are intended to provide a brief, general description of the suitable computing system 900 in which the various aspects can be implemented. While the description above is in the general context of computer-executable instructions that can run on one or more computers, those skilled in the art will recognize that a novel embodiment also can be implemented in combination with other program modules and/or as a combination of hardware and software.

The computing system 900 for implementing various aspects includes the computer 902 having processing unit(s) 904, a computer-readable storage such as a system memory 906, and a system bus 908. The processing unit(s) 904 can be any of various commercially available processors such as single-processor, multi-processor, single-core units and multi-core units. Moreover, those skilled in the art will appreciate that the novel methods can be practiced with other computer system configurations, including minicomputers, mainframe computers, as well as personal computers (e.g., desktop, laptop, etc.), hand-held computing devices, microprocessor-based or programmable consumer electronics, and the like, each of which can be operatively coupled to one or more associated devices.

The system memory 906 can include computer-readable storage (physical storage media) such as a volatile (VOL) memory 910 (e.g., random access memory (RAM)) and non-volatile memory (NON-VOL) 912 (e.g., ROM, EPROM, EEPROM, etc.). A basic input/output system (BIOS) can be stored in the non-volatile memory 912, and includes the basic routines that facilitate the communication of data and signals between components within the computer 902, such as during startup. The volatile memory 910 can also include a high-speed RAM such as static RAM for caching data.

The system bus 908 provides an interface for system components including, but not limited to, the system memory 906 to the processing unit(s) 904. The system bus 908 can be any of several types of bus structure that can further interconnect to a memory bus (with or without a memory controller), and a peripheral bus (e.g., PCI, PCIe, AGP, LPC, etc.), using any of a variety of commercially available bus architectures.

The computer 902 further includes machine readable storage subsystem(s) 914 and storage interface(s) 916 for interfacing the storage subsystem(s) 914 to the system bus 908 and other desired computer components. The storage subsystem(s) 914 (physical storage media) can include one or more of a hard disk drive (HDD), a magnetic floppy disk drive (FDD), and/or optical disk storage drive (e.g., a CD-ROM drive DVD drive), for example. The storage interface(s) 916 can include interface technologies such as EIDE, ATA, SATA, and IEEE 1394, for example.

One or more programs and data can be stored in the memory subsystem 906, a machine readable and removable memory subsystem 918 (e.g., flash drive form factor technology), and/or the storage subsystem(s) 914 (e.g., optical, magnetic, solid state), including an operating system 920, one or more application programs 922, other program modules 924, and program data 926.

The one or more application programs 922, other program modules 924, and program data 926 can include the entities and components of the system 100 of FIG. 1, the entities and components of the scheme 200 of FIG. 2, the entities and flow of the framework 300 of FIG. 3, and the methods represented by the flowcharts of FIGS. 4-8, for example.

Generally, programs include routines, methods, data structures, other software components, etc., that perform particular tasks or implement particular abstract data types. All or portions of the operating system 920, applications 922, modules 924, and/or data 926 can also be cached in memory such as the volatile memory 910, for example. It is to be appreciated that the disclosed architecture can be implemented with various commercially available operating systems or combinations of operating systems (e.g., as virtual machines).

The storage subsystem(s) 914 and memory subsystems (906 and 918) serve as computer readable media for volatile and non-volatile storage of data, data structures, computer-executable instructions, and so forth. The instructions can exist on non-transitory media. Such instructions, when executed by a computer or other machine, can cause the computer or other machine to perform one or more acts of a method. The instructions to perform the acts can be stored on one medium, or could be stored across multiple media, so that the instructions appear collectively on the one or more computer-readable storage media, regardless of whether all of the instructions are on the same media.

Computer readable media can be any available media that can be accessed by the computer 902 and includes volatile and non-volatile internal and/or external media that is removable or non-removable. For the computer 902, the media accommodate the storage of data in any suitable digital format. It should be appreciated by those skilled in the art that other types of computer readable media can be employed such as zip drives, magnetic tape, flash memory cards, flash drives, cartridges, and the like, for storing computer executable instructions for performing the novel methods of the disclosed architecture.

A user can interact with the computer 902, programs, and data using external user input devices 928 such as a keyboard and a mouse. Other external user input devices 928 can include a microphone, an IR (infrared) remote control, a joystick, a game pad, camera recognition systems, a stylus pen, touch screen, gesture systems (e.g., eye movement, head movement, etc.), and/or the like. The user can interact with the computer 902, programs, and data using onboard user input devices 930 such a touchpad, microphone, keyboard, etc., where the computer 902 is a portable computer, for example. These and other input devices are connected to the processing unit(s) 904 through input/output (I/O) device interface(s) 932 via the system bus 908, but can be connected by other interfaces such as a parallel port, IEEE 1394 serial port, a game port, a USB port, an IR interface, etc. The I/O device interface(s) 932 also facilitate the use of output peripherals 934 such as printers, audio devices, camera devices, and so on, such as a sound card and/or onboard audio processing capability.

One or more graphics interface(s) 936 (also commonly referred to as a graphics processing unit (GPU)) provide graphics and video signals between the computer 902 and external display(s) 938 (e.g., LCD, plasma) and/or onboard displays 940 (e.g., for portable computer). The graphics interface(s) 936 can also be manufactured as part of the computer system board.

The computer 902 can operate in a networked environment (e.g., IP-based) using logical connections via a wired/wireless communications subsystem 942 to one or more networks and/or other computers. The other computers can include workstations, servers, routers, personal computers, microprocessor-based entertainment appliances, peer devices or other common network nodes, and typically include many or all of the elements described relative to the computer 902. The logical connections can include wired/wireless connectivity to a local area network (LAN), a wide area network (WAN), hotspot, and so on. LAN and WAN networking environments are commonplace in offices and companies and facilitate enterprise-wide computer networks, such as intranets, all of which may connect to a global communications network such as the Internet.

When used in a networking environment the computer 902 connects to the network via a wired/wireless communication subsystem 942 (e.g., a network interface adapter, onboard transceiver subsystem, etc.) to communicate with wired/wireless networks, wired/wireless printers, wired/wireless input devices 944, and so on. The computer 902 can include a modem or other means for establishing communications over the network. In a networked environment, programs and data relative to the computer 902 can be stored in the remote memory/storage device, as is associated with a distributed system. It will be appreciated that the network connections shown are exemplary and other means of establishing a communications link between the computers can be used.

The computer 902 is operable to communicate with wired/wireless devices or entities using the radio technologies such as the IEEE 802.xx family of standards, such as wireless devices operatively disposed in wireless communication (e.g., IEEE 802.11 over-the-air modulation techniques) with, for example, a printer, scanner, desktop and/or portable computer, personal digital assistant (PDA), communications satellite, any piece of equipment or location associated with a wirelessly detectable tag (e.g., a kiosk, news stand, restroom), and telephone. This includes at least Wi-Fi (or Wireless Fidelity) for hotspots, WiMax, and Bluetooth™ wireless technologies. Thus, the communications can be a predefined structure as with a conventional network or simply an ad hoc communication between at least two devices. Wi-Fi networks use radio technologies called IEEE 802.11x (a, b, g, etc.) to provide secure, reliable, fast wireless connectivity. A Wi-Fi network can be used to connect computers to each other, to the Internet, and to wire networks (which use IEEE 802.3-related media and functions).

The illustrated and described aspects can be practiced in distributed computing environments where certain tasks are performed by remote processing devices that are linked through a communications network. In a distributed computing environment, program modules can be located in local and/or remote storage and/or memory system.

What has been described above includes examples of the disclosed architecture. It is, of course, not possible to describe every conceivable combination of components and/or methodologies, but one of ordinary skill in the art may recognize that many further combinations and permutations are possible. Accordingly, the novel architecture is intended to embrace all such alterations, modifications and variations that fall within the spirit and scope of the appended claims. Furthermore, to the extent that the term "includes" is used in either the detailed description or the claims, such term is intended to be inclusive in a manner similar to the term "comprising" as "comprising" is interpreted when employed as a transitional word in a claim.

What is claimed is:

1. A computer-implemented data processing system having non-transitory computer readable media that stores executable instructions executed by a processor, comprising:
a matrix component that represents a sparse matrix of dyadic data as tuples distributed across a cluster of machines;
a partitioning component that partitions a non-negative matrix along a short dimension into key-value pairs, in order to maximize parallelism and data locality, the non-negative matrix factored from the sparse matrix according to a probabilistic non-negative matrix factorization (NMF);
a distribution component that distributes the key-value pairs across the cluster of machines, to scale up NMF to a distributed NMF (DNMF); and
a microprocessor that executes computer-executable instructions in a memory.

2. The system of claim 1, wherein the probabilistic NMF is a Gaussian NMF to model Gaussian data.

3. The system of claim 1, wherein the probabilistic NMF is a Poisson NMF to model Poisson data.

4. The system of claim 1, wherein the probabilistic NMF is an exponential NMF to model exponential data.

5. The system of claim 1, wherein the computation component facilitates element-wise division and element-wise multiplication as distributed across the multiple machines.

6. The system of claim 1, wherein the dyadic data is web search data that includes term-and-clicked-link tuples, the NMF applied to smooth a matrix of the tuples to elevate search relevance.

7. A computer-implemented data processing method executable via a processor and memory, comprising acts of:
partitioning a real matrix of dyadic data into a first non-negative matrix and a second non-negative matrix;
partitioning the first non-negative matrix along a short dimension for maximizing parallelism and data locality, to provide first non-negative values;
distributing the first non-negative values on multiple machines;
applying NMF to the first non-negative values in memory of the multiple machines, resulting in a distributed NMF (DNMF);
performing the partitioning, the distributing, and the applying on the second non-negative matrix and associated second non-negative values; and
utilizing a microprocessor that executes instructions stored in a memory.

8. The method of claim 7, further comprising applying a probabilistic NMF to the non-negative values of the first non-negative matrix.

9. The method of claim 7, further comprising decomposing the first non-negative matrix into auxiliary matrices for distributed and parallel processing by the machines.

10. The method of claim 9, further comprising:
distributing a first auxiliary matrix of the auxiliary matrices as a first set of tuples across a set of the machines; and
applying NMF to the distributed first set of tuples to output a numerator value.

11. The method of claim 10, further comprising:
distributing a second auxiliary matrix of the auxiliary matrices as a second set of tuples across a set of the machines; and
applying NMF to the distributed second set of tuples to output a denominator value.

12. The method of claim 7, further comprising applying a Gaussian NMF, a Poisson NMF, or an Exponential NMF to the non-negative values in the memory of the machines.

13. The method of claim 7, further comprising performing element-wise division on the distributed first non-negative values and second non-negative values locally on the machines.

14. The method of claim 7, further comprising performing element-wise multiplication on the distributed first non-negative values and second non-negative values locally on the machines.

15. A computer-implemented data processing method executable via a processor and memory, comprising acts of:
partitioning a real matrix of dyadic data into a first non-negative matrix and a second non-negative matrix;
distributing real matrix tuples of the real matrix across machines of a cluster;
partitioning the first non-negative matrix along a short dimension for maximizing parallelism and data locality, to provide first auxiliary non-negative values;
distributing the first auxiliary non-negative values across the machines;
applying probabilistic NMF to the distributed first auxiliary non-negative values on the machines, resulting in a distributed NMF;
computing the probabilistic NMF locally for each distributed real matrix tuple and each distributed first auxiliary non-negative value and in parallel across the machines;
sending results of the local probabilistic NMF computation on each of the machines for global summation; and
utilizing a microprocessor that executes instructions stored in a memory.

16. The method of claim 15, further comprising storing the first auxiliary non-negative values on corresponding machines as key-value pairs that represent the first non-negative matrix.

17. The method of claim 15, further comprising performing the partitioning, the distributing, the applying, the computing, and the sending on the second non-negative matrix and associated second auxiliary non-negative values.

18. The method of claim 17, further comprising applying a Gaussian NMF, a Poisson NMF, or an Exponential NMF as the probabilistic NMF to the first auxiliary non-negative values and the second auxiliary non-negative values of the machines.

19. The method of claim 15, further comprising:
performing element-wise division on the distributed first non-negative values and second non-negative values locally on the machines; and
performing element-wise multiplication on the distributed first non-negative values and second non-negative values locally on the machines.

20. The method of claim 15, further comprising outputting a reconstructed real matrix that includes results representative of the probabilistic NMF as applied to the first non-negative matrix and the second non-negative matrix.

\* \* \* \* \*